United States Patent
Nakajima et al.

(10) Patent No.: US 9,197,345 B2
(45) Date of Patent: Nov. 24, 2015

(54) RECEIVER OPTICAL MODULE FOR RECEIVING WAVELENGTH MULTIPLEXED OPTICAL SIGNALS AND METHOD TO ASSEMBLE THE SAME

(71) Applicant: Sumitomo Electric Industries, Ltd., Osaka-shi (JP)

(72) Inventors: Fumihiro Nakajima, Yokohama (JP); Hiroshi Hara, Yokohama (JP); Yasushi Fujimura, Yokohama (JP); Kazushige Oki, Yokohama (JP)

(73) Assignee: Sumitomo Electric Industries, Ltd., Osaka-shi (JP)

( * ) Notice: Subject to any disclaimer, the term of this patent is extended or adjusted under 35 U.S.C. 154(b) by 0 days.

(21) Appl. No.: 13/708,609

(22) Filed: Dec. 7, 2012

(65) Prior Publication Data

US 2013/0148970 A1 Jun. 13, 2013

(30) Foreign Application Priority Data

Dec. 13, 2011 (JP) ................. 2011-271963

(51) Int. Cl.
*G02B 6/42* (2006.01)
*H04J 14/02* (2006.01)
(52) U.S. Cl.
CPC ............ *H04J 14/02* (2013.01); *G02B 6/4215* (2013.01); *G02B 6/4214* (2013.01); *G02B 6/4292* (2013.01)
(58) Field of Classification Search
CPC ... G02B 6/4214; G02B 6/4215; G02B 6/4292
See application file for complete search history.

(56) References Cited

U.S. PATENT DOCUMENTS

| | | | |
|---|---|---|---|
| 2003/0152113 A1 | 8/2003 | Kropp | |
| 2009/0269077 A1* | 10/2009 | Sone et al. | 398/135 |
| 2011/0225792 A1 | 9/2011 | Oki et al. | |

FOREIGN PATENT DOCUMENTS

| | | |
|---|---|---|
| CN | 1191023 A | 8/1998 |
| CN | 1402896 A | 3/2003 |
| CN | 201708807 U | 1/2011 |
| CN | 101984565 A | 3/2011 |
| JP | 2002-243990 A | 8/2002 |
| JP | 2003-504661 A | 2/2003 |
| JP | 2003-227970 A | 8/2003 |
| JP | 2009-198958 A | 9/2009 |
| JP | 2010-164856 A | 7/2010 |

OTHER PUBLICATIONS

Notification of Reasons for Rejection in Japanese Patent Application No. 2011-271963, dated Jul. 21, 2015.

* cited by examiner

*Primary Examiner* — Ryan Lepisto
*Assistant Examiner* — Mary El Shammaa
(74) *Attorney, Agent, or Firm* — Venable LLP; Michael A. Sartori; Tamatane J. Aga

(57) ABSTRACT

A receiver optical module to facilitate the assembling is disclosed. The receiver optical module includes an intermediate assembly including the optical de-multiplexer and the optical reflector each mounted on the upper base, and the lens and the PD mounted on the sub-mount. The latter assembly is mounted on the bottom of the housing; while, the former assembly is also mounted on the bottom through the lower base. The upper base is apart from the bottom and extends in parallel to the bottom to form a surplus space where the amplifying circuit is mounted.

15 Claims, 8 Drawing Sheets

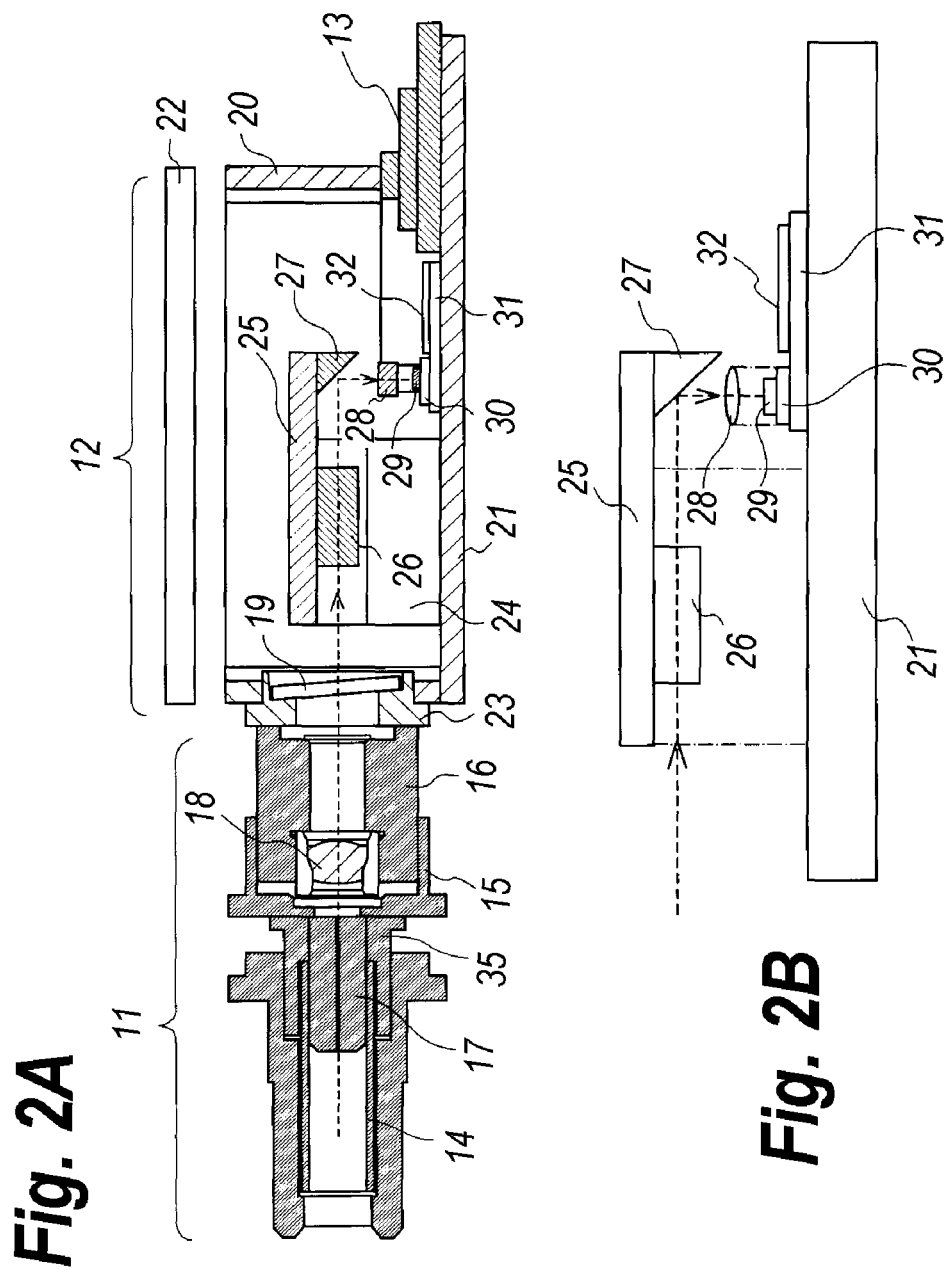

*Fig. 3A*
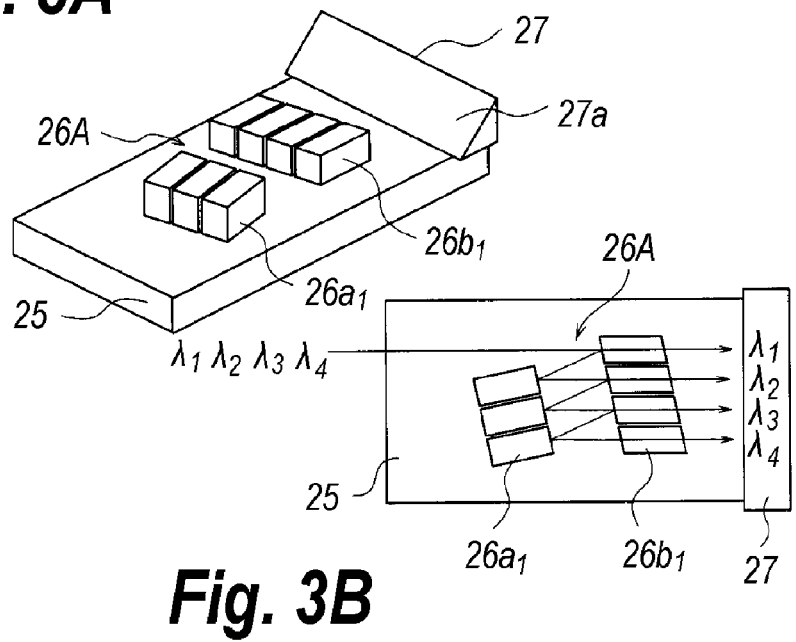
*Fig. 3B*
*Fig. 3C*
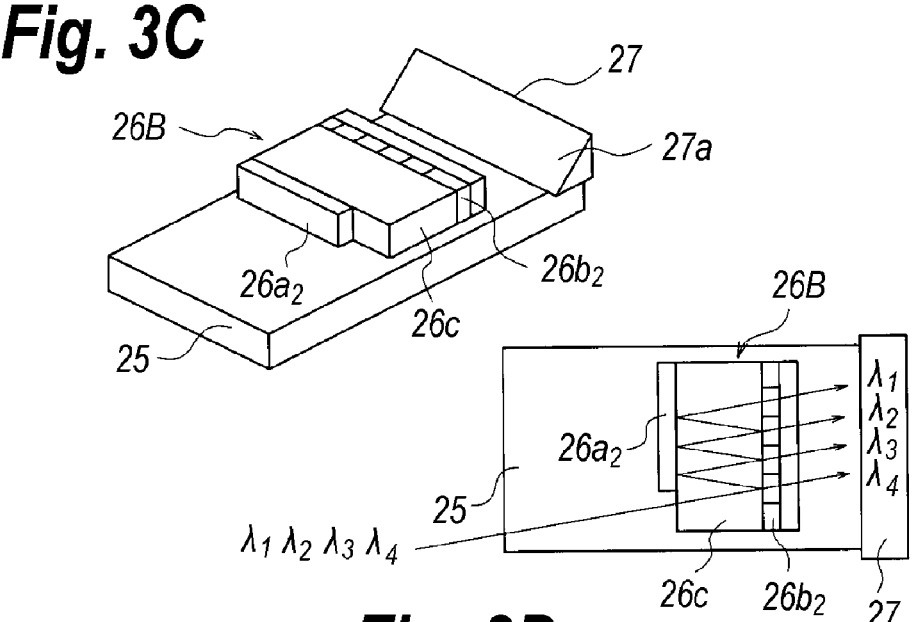
*Fig. 3D*

RECEIVER OPTICAL MODULE FOR RECEIVING WAVELENGTH MULTIPLEXED OPTICAL SIGNALS AND METHOD TO ASSEMBLE THE SAME

BACKGROUND OF THE INVENTION

1. Field of the Invention

The present invention relates to a receiver optical module to be installed within an optical transceiver, in particular, the invention relates to a receiver optical module to receive wavelength multiplexed optical signals.

2. Related Prior Arts

The wavelength division multiplexed (WDM) system has been popular in the optical communication system. One prior patent application has disclosed an optical transceiver that implements four transmitter optical sub-assemblies (TOSA) each operable in 10 Gbps, four receiver optical sub-assemblies each operable in 10 Gbps, an optical multiplexer and an optical de-multiplexer. Such an optical transceiver has realized the transmission speed of 40 Gbps.

FIG. 8A is a plan view of an optical arrangement of components which realizes the optical de-multiplexing function, while, FIG. 8B is a side view thereof. The multiplexed optical signal provided from the external optical fiber 1 passes an optical medium 5 after it is reflected by a mirror 4 and fully reflected by the optical reflector 5a. The optical filter 5b transmits only one of wave optical signals with a specific wavelength $\lambda_1$ but reflects rest of optical signals at a first portion thereof. Only one of rest of optical signals with another specific wavelength $\lambda_2$ can transmits the optical filter in the second portion thereof after they passes the optical medium 5 and reflected by the reflector 5a, and further rest of optical signals are reflected by the optical filter 5b in the second portion thereof. The third portion of the optical filter 5b cap transmits only one of optical signals with the third specific wavelength $\lambda_3$, and the fourth portion of the optical filter 5b can transmits the rest optical signal with the fourth specific wavelength $\lambda_4$. Thus, the optical signals with a plural wavelengths, $\lambda_1$ to $\lambda_4$, can be de-multiplexed and received by respective photodiodes (hereafter denoted by PD) 7a.

A conventional optical module for the multiplexed optical signals, the optical components such as the optical de-multiplexer, the mirror block, the lenses, the PDs, and so on are two dimensionally arranged in the base, which expands the footprint of the components. Recent optical transceivers are forced to be further compact in dimensions thereof. For such requests, the two-dimensional arrangement of the optical component becomes fatal factor to obstruct the installation of the optical module within a compact optical transceiver.

SUMMARY OF THE INVENTION

One aspect of the present application relates to an optical module that receives optical signals each having a specific wavelength different from others. The optical module according to one embodiment includes a first assembly, a second assembly, and a housing. The first assembly includes a plurality of PDs and a plurality of concentrating lenses each corresponding to respective PDs. The PDs and the concentrating lenses are mounted on a sub-mount. The second assembly includes an optical de-multiplexer and an optical reflector. The optical de-multiplexer de-multiplexes the optical signals depending on the specific wavelengths. The optical reflector reflects the de-multiplexed optical signals toward respective PDs. The optical de-multiplexer and the optical reflector are mounted on an upper base. The housing has a bottom that installs the first assembly and the second assembly thereon. One feature of the optical module according to an embodiment is that the sub-mount of the first assembly is directly mounted on the bottom of the housing; while, the upper base of the second assembly is indirectly mounted on the bottom of the housing through the lower base.

The upper base in the primary surface thereof, on which the optical de-multiplexer and the optical reflector are mounted, extends substantially in parallel to the bottom of the housing. The optical reflector, the concentrating lenses, and PDs are vertically arranged with respect to the bottom of the housing, which narrows an area to mount optical components and forms a surplus space to mount electrical components thereon.

Another aspect of the present application relates to a method to assemble an optical module that includes an optical de-multiplexer, an optical reflector, a plurality of concentrating lenses, and PDs. The method includes steps of: (1) mounting the PDs directly on a sub-mount and the concentrating lenses indirectly on the sub-mount through a spacer as referring to physical dimensions of the PDs and the concentrating lenses, where the PDs, the concentrating lenses, and the sub-mount form the first intermediate assembly; (2) mounting the optical de-multiplexer and the optical reflector on an upper base as referring to alignment marks prepared on a surface of the upper base, where the optical de-multiplexer, the optical reflector, and the upper base form the second intermediate assembly; (3) installing the first assembly in a preset position on a bottom of a housing; and (4) installing the second intermediate assembly within the housing as aligning the optical de-multiplexer optically with the PDs.

The step of installing the second intermediate assembly within the housing includes steps of: abutting a front end of the second intermediate assembly against an inner frond side of the housing, displacing the second intermediate assembly by a preset distance toward an inner rear side of the housing, and performing fine alignments of the second intermediate assembly along a first direction perpendicularly connecting the inner front side and the inner rear side of the housing and a second direction perpendicular to the first direction.

BRIEF DESCRIPTION OF DRAWINGS

The foregoing and other purposes, aspects and advantages will be better understood from the following detailed description of a preferred embodiment of the invention with reference to the drawings, in which:

FIG. 2A is a side cross section of the receiver optical module shown in FIG. 1, and FIG. 2B magnifies the optical coupling status between the PD and the optical de-multiplexer;

FIGS. 3A and 3B show an embodiment of the optical components mounted on the upper base, and FIGS. 3C and 3D show a modified embodiment of the optical components;

DESCRIPTION OF PREFERRED EMBODIMENTS

Next, some embodiments according to the present invention will be described as referring to drawings. In the description of the drawings, numerals or symbols same or similar to each other will refer to elements same or similar to each other without overlapping explanations.

Figure 1:
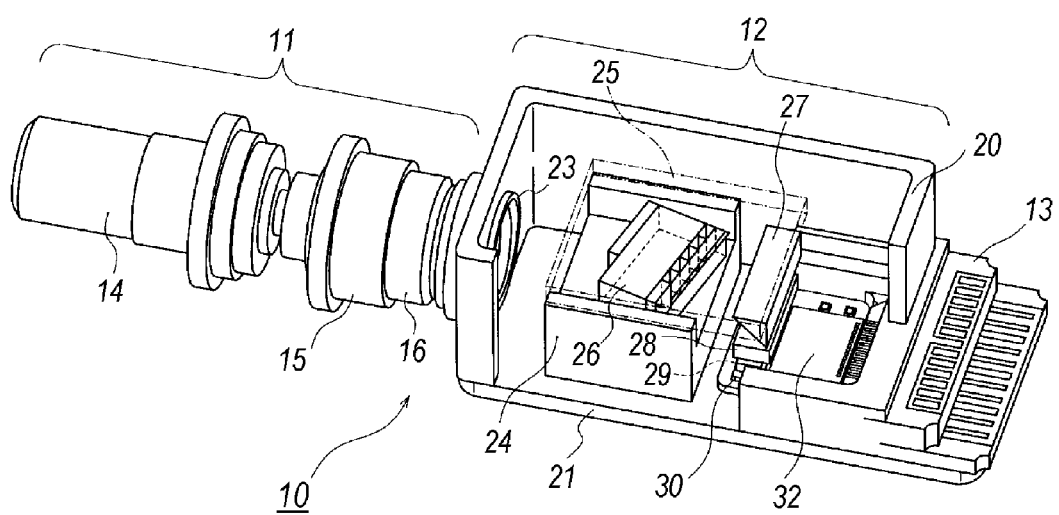
FIG. 1 is a perspective cutaway view of a receiver optical module according to an embodiment of the invention.

FIG. 1 is a perspective view of a receiver optical module, where a portion thereof is removed to show the inside of the module, implemented within an optical transceiver, FIG. 2A is a side cross section of the module, and FIG. 3B magnifies a primary portion to couple optical devices installed in the module with an external optical fiber.

The receiver optical module 10 shown in FIGS. 1 and 2 includes a coupling unit 11, a housing 12, and an electrical connector 13. The coupling unit 11 provides a sleeve 14, a joint sleeve 15 (hereafter denoted as J-sleeve), a joint 16, a stub 17, and a first lens 18. The housing 12, which has a box shape, provides a side 20, a bottom 21 and a lid 22. A front side 20 of the housing provides an optical window 19 held by the holder 23. The bottom 21 mounts a primary portion of the module thereon. The primary portion includes an upper base 25, an optical de-multiplexer 26 and am optical reflector 27, where the optical de-multiplexer 26 and the optical reflector 27 are mounted on the upper base 25, and the upper base 25 is indirectly mounted on the bottom 21 through the lower base 24. The primary portion further includes a plurality of PDs 29, a plurality of second lenses 28 to concentrate light, and an amplifier circuit 32, where the PDs 29, which are directly mounted on a sub-mount 30. The PDs 29 with the sub-mount 30, the second lenses, and the amplifier circuit are mounted on the bottom 21 through a metal base 31.

The sleeve 14 receives in a front portion thereof a ferrule secured in a tip of an external fiber not illustrated in the figures, while the rest portion close to the housing 12 receive a tip portion of the stub 17. The root portion of the stub 17 is press-fitted within a bush 35. The J-sleeve 15 optically couples the PDs 28 with the external fiber. Specifically, the optical alignment along the optical axis denoted by an arrow in the figure is performed by adjusting the insertion depth of the J-sleeve 15 within the joint 16, while, the optical alignment perpendicular to the optical axis is performed by sliding the bush 35 on an end surface of the J-sleeve 15.

The housing 12 has a box shape. The side 20 may be made of metal, typically an alloy of iron, nickel, and cobalt, which is generally called as Kovar; while, the bottom 21 may be made of metal, for instance, copper molybdenum (CuMo), copper tungsten (CuW), and so on. The lid 12 air-tightly seals the inside of the housing 12. The electronic connector 13 is a type of the multi-layered ceramics with a plurality of electronics pads in the top surfaces thereof.

The joint 16, which may be made of metal, is welded to the holder 23, and the holder 23 is fixed to the frond side 20 of the housing 12. The joint 16 holds the first lens 18 therein. The first lens collimates light provided from the external fiber set in the sleeve 14. The collimated light goes to optical de-multiplexer 26 passing through the window 19.

The optical de-multiplexer 26 de-multiplexes the light into a plurality of optical beams. Specifically, the light incoming to the optical module 10 from the external fiber includes a plurality of optical signals each having a specific wavelength different from each other, and the optical de-multiplexer 26 divides the light into respective optical signals depending on the wavelengths thereof. Details of the optical de-multiplexer 26 will be described later. The de-multiplexed optical signals enter the optical reflector 27, reflected thereby, and enter the PDs 28. The optical de-multiplexer 26 and the optical reflector 27 are supported by the upper base 25, and the upper base 25 is supported by the lower base 24. That is, the optical de-multiplexer 26 and the optical reflector 27 are mounted in the bottom surface of upper base 25, and the upper base 25 is mounted on the lower base 24 such that the bottom surface of the upper base 25 faces and makes substantially in parallel to the bottom 21 of the housing 12.

Each of the respective optical signals de-multiplexed by the optical de-multiplexer 26 is focused by the second lens 28 and then received by the PD 29. The PD 29 is mounted on the metal base 31 through the sub-mount 30. The lens 28, as described in detail later, may be integrated on the PD 29, or mounted in the bottom surface of the upper base 25 as those of the optical de-multiplexer 26 and the optical reflector 27.

As schematically illustrated in FIG. 2B, the optical de-multiplexer 26 and the optical reflector 27 are arranged in the upper base 25. Specifically, they are arranged in the bottom surface of the upper base 25 so as to be apart from the bottom 21 of the housing 12. On the other hand, the PDs 29 and the concentrating lenses 28 are arranged on the bottom 21 through the sub-mount 30 and the metal base 31 such that the PDs 29, the concentrating lenses 28, and the optical reflector 27 are vertically arranged. Thus, the optical components from the optical de-multiplexer 26 to the sub-mount 30 are three dimensionally disposed in the housing 12, which forms a surplus space within the housing 12 to install the amplifying circuit 32 in close to the PDs 29 without enlarging the size of the housing 12.

FIGS. 3A to 3D show various arrangements of the optical de-multiplexer 26 and the optical reflector 27 mounted in the upper base 25. The optical de-multiplexer 26A shown in FIGS. 3A and 3B divide the optical filters $26b_1$ from optical reflectors $26a_1$. In this arrangement shown in FIGS. 3A and 3B, the optical reflectors $26a_1$ each has a characteristic to reflect light with all wavelengths under consideration, $\lambda_1$ to $\lambda_4$; while, the optical filters $26b_1$ each transmits only one of optical signals with a specific wavelength and reflects the other optical signals. Specifically, the first optical filter $26b_1$ that receives the optical signals with wavelengths of $\lambda_1$ to $\lambda_4$ can transmits only the optical signal with the wavelength $\lambda_1$ but reflects the other optical signals with wavelengths of $\lambda_2$ to $\lambda_4$, which are reflected by the first reflector $26a_1$ and enter the second filter $26b_1$. The second filter $26b_1$ transmits only the optical signal with the wavelength of $\lambda_2$ but reflects the optical signals with the wavelengths of $\lambda_3$ and $\lambda_4$, which are reflected by the second reflector $26a_1$ and enter the third filter $26b_1$. The third filter $26b_1$ transmits only the optical signal with the wavelength of $\lambda_3$ but reflects the optical signal with the wavelength of $\lambda_4$, which is reflected by the last reflector $26a_1$ and enters the last filter $26b_1$. The last filter $26b_1$ transmits only the optical signal with the wavelength of $\lambda_4$. When the optical signals incoming to the optical module 10 have only the wavelength of $\lambda_1$ to $\lambda_4$ without any other wavelengths, the last optical filter $26b_1$ can be eliminated.

The reflector 27 is, for instance, made of glass with a reflecting surface 27a coated with a reflecting medium, or a type of the prism made of glass material. The reflecting surface of the bulk reflector 27 makes an angle of 45° with respect to the optical axis of the optical de-multiplexer 26 and that of the PDs 29. The respective optical signals de-multiplexed by the de-multiplexer 26 are reflected by the reflecting surface 27a toward the concentrating lenses 28 to be received by the PDs 29.

FIGS. 3C and 3D show another arrangement of the optical de-multiplexer 26B. This optical de-multiplexer 26B integrates the single optical reflector $26a_2$, and optical filters $26b_2$ each attached to a transparent body 26c. The optical signals with the wavelengths of $\lambda_1$ to $\lambda_4$ incoming to the optical module 10 enters the transparent body 26c, which is made of material transparent to the optical signals with the wavelengths of $\lambda_1$ to $\lambda_4$. The first filter $26b_2$ transmits only the optical signal with the wavelength of $\lambda_1$ but reflected to the other optical signals with the wavelengths of $\lambda_2$ to $\lambda_4$, which transmits the transparent body 26, reflected by the optical reflector $26a_2$, transmits the transparent body 26 again and enter the optical filter $26b_2$. The second optical filter $26b_2$ transmits only the optical signal with the wavelength of $\lambda_2$ but reflects other optical signals, and so on similar to those of the aforementioned arrangement shown in FIGS. 3A and 3B.

When the optical filters, $26b_1$ and $26b_2$, are the type of the band-pass filter, the arrangement thereof is not restricted to those of the order of the wavelength. On the other hand, when the optical filters, $26b_1$ and $26b_2$, are the type of the high-pass or low-pass filter, the order thereof is necessary to be the order of the wavelength.

Figure 4A:
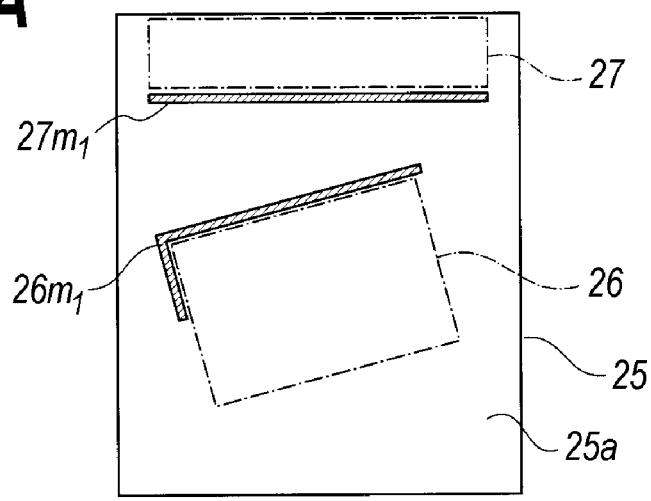
FIGS. 4A and 4B are plan views showing an alignment marks prepared on the surface of the upper base to mount the optical de-multiplexer and the optical reflector thereon.
Figure 4B:
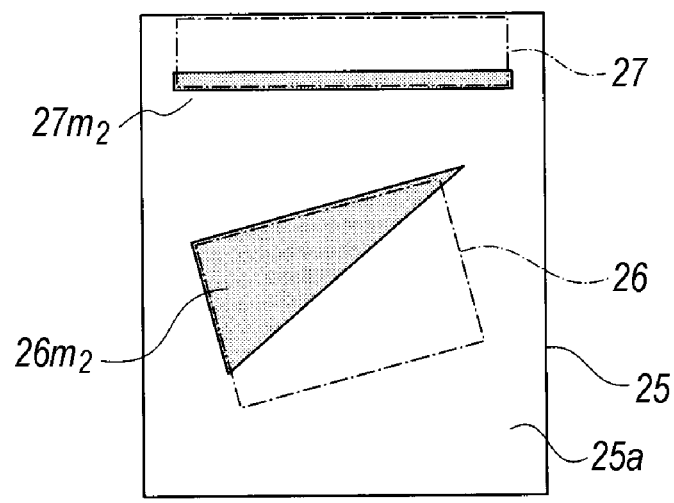

FIGS. 4A and 4B explain examples of a method to mount the optical de-multiplexer 26 on the bottom surface 25a of the upper base 25. The upper base is made of, for instance, ceramics such as aluminum ($Al_2O_3$) and has alignment marks with lines, $26m_1$ and $27m_1$, shown in FIG. 4A, or with two dimensional shapes, $26m_2$ and $27m_2$ shown in FIG. 4B. The alignment mark for the optical de-multiplexer 26 has an L-shaped line $26m_1$, or a right triangle $26m_2$. The optical de-multiplexer 26 is aligned in the corner thereof with the corner of the L-shaped line $26m_1$, or with the right corner of the triangle $26m_2$. The optical reflector 27 in the front edge thereof is aligned with the line $27m_1$, or with an edge of the band $27m_2$. The optical de-multiplexer 26 and the optical reflector 27 are assembled with the upper base 25, and can be handled as one component as the second intermediate assembly.

Figure 5A:
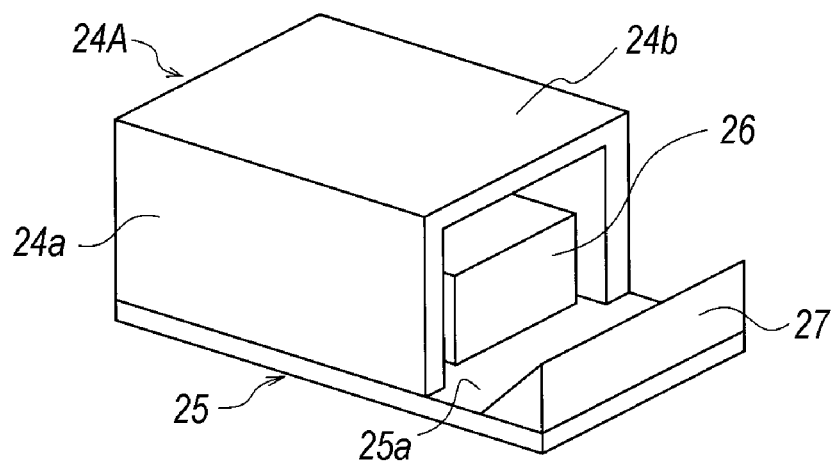
FIG. 5A is a second intermediate assembles including the optical de-multiplexer and the optical reflector mounted on the upper base which is assembled with the lower base.
Figure 5B:
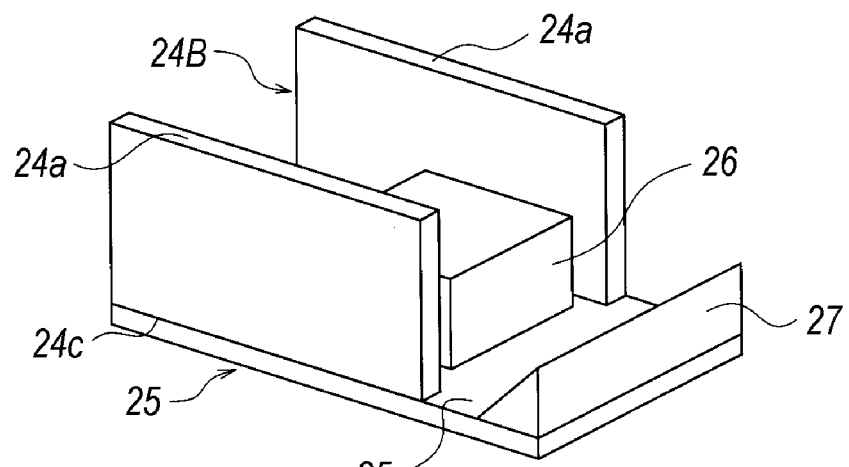
FIG. 5B shows a modification of the first assembly.

FIGS. 5A and 5B are perspective views of the intermediate assembly with the optical de-multiplexer 26 and the optical reflector 27 to be assembled with the lower base 24A or 24B. The lower base 24A shown in FIG. 5A has a U-shaped cross section with tips of the sides 24a fixed to respective ends of the bottom surface 25a of the upper base 25. Two sides 24a of the U-shape surround the optical de-multiplexer 26. The bottom 24b of the U-shape is to be fixed to the bottom 21 of the housing 12 of the optical module 10. The lower base 24 may be made material with linear expansion co-efficient close to the upper base 25, which is, for instance, aluminum oxide ($Al_2O_3$), aluminum nitride (AlN), cupper molybdenum (CuMo), copper tungsten (CuW), and so on.

The lower base 24B shown in FIG. 5B divides two sides of the U-shape in FIG. 5A into independent sides 24b arranged substantially in parallel to each other at respective sides of the upper base 25. One end 24c of the side 24b is fixed to the bottom surface 25a of the upper base 25. Although the bottom base 24B in FIG. 5B in the side 24b thereof is independent of the upper base 25, the side 24b can be integrally formed with the upper base 25.

The assembly with the upper base 25, on which the optical de-multiplexer 26 and the optical reflector 27 are mounted, and the lower base 24 fixed to the upper base 25 is to be mounted on the bottom 21 of the housing 12 as illustrated in FIGS. 2A and 2B. The upper base 25 in the bottom surface 25a thereof is independent of and extends in parallel to the bottom 21 of the housing 12. This arrangement can substantially extend an area to mount components thereon.

Figure 6:
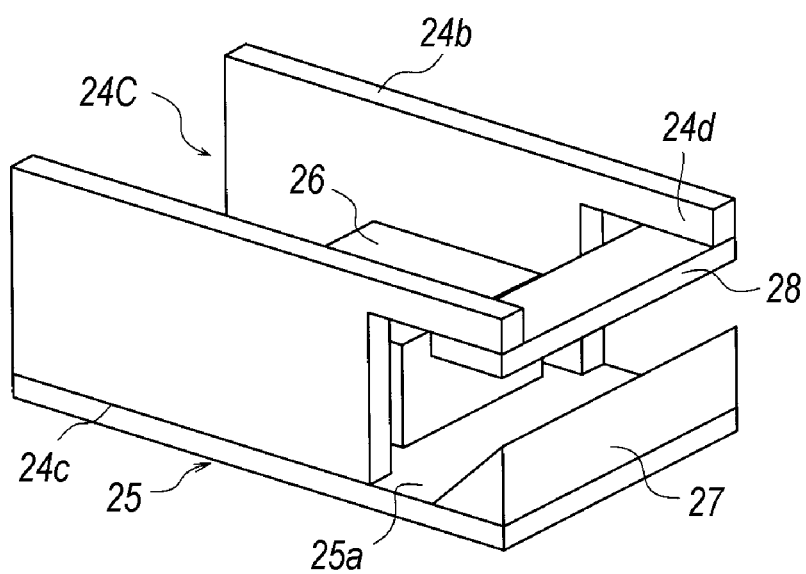
FIG. 6 shows a still another modification of the second assembly.

FIG. 6 is a perspective view showing still another embodiment of the lower base 24C. This lower base 24C cuts the side 24a thereof in the rear portion to leave a saddle 24d. The saddle 24d mounts the second lens 28 thereon. The second lens 28 of the present embodiment is a type of, what is called, the arrayed lens 28B including a plurality of lens elements such as shown in FIG. 7B. Each of the lens elements corresponds to one of the optical signals de-multiplexed by the optical de-multiplexer 26 and concentrates the optical signals to respective PDs 29. Thus, the embodiment shown in FIG. 6 forms an intermediate assembly integrating the optical de-multiplexer 26, the optical reflector with the second lens 28.

Figure 7A:
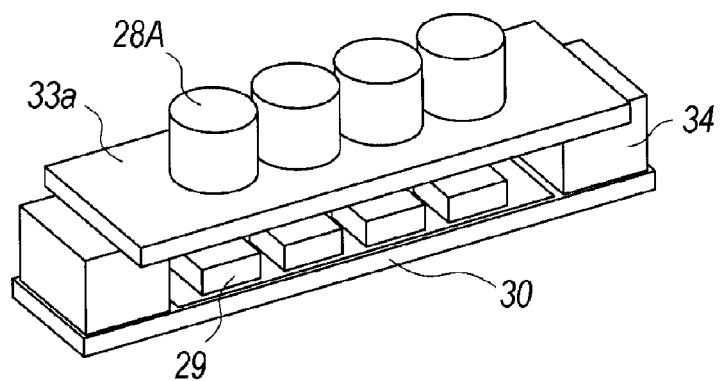
FIGS. 7A to 7C show an arrangement of the first module, where the lens support, which is supported by the metal base, by the spacer so as to set the concentrating lens apart from the PDs.
Figure 7B:
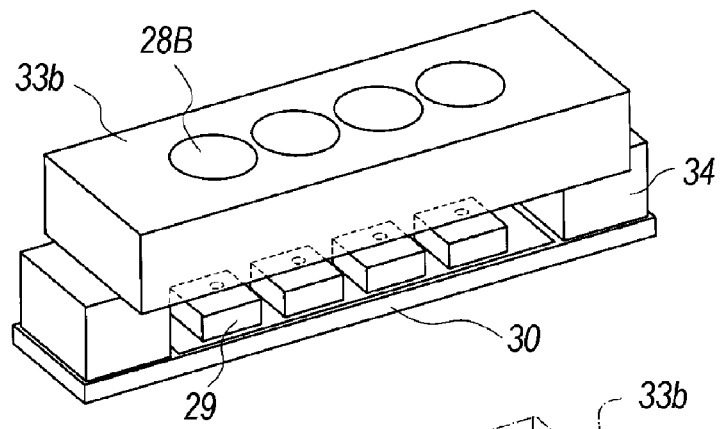
Figure 7C:
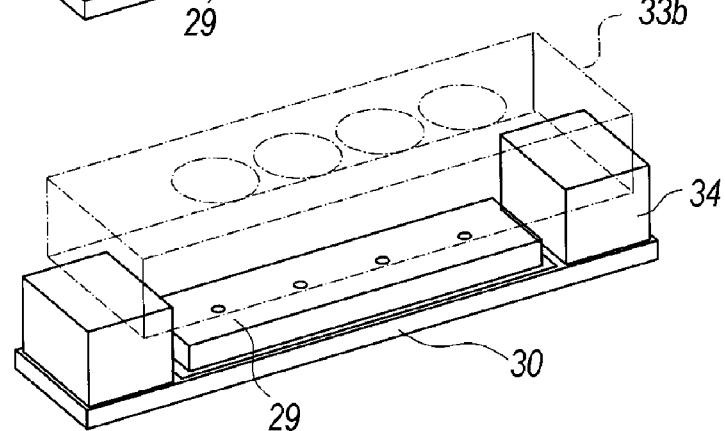
Figure 8A:
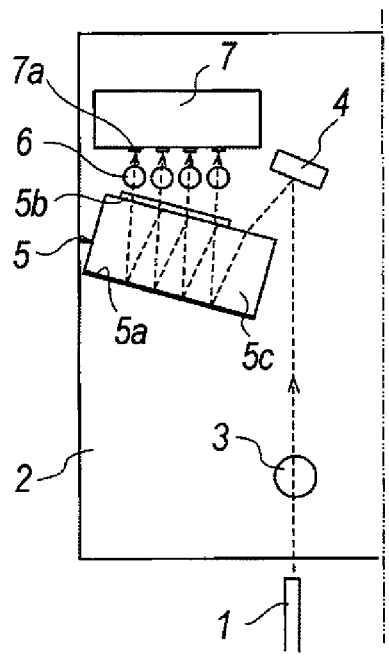
FIG. 8A is a plan view and FIG. 8B is a side view of the optical coupling status implemented in a conventional optical module.
Figure 8B:
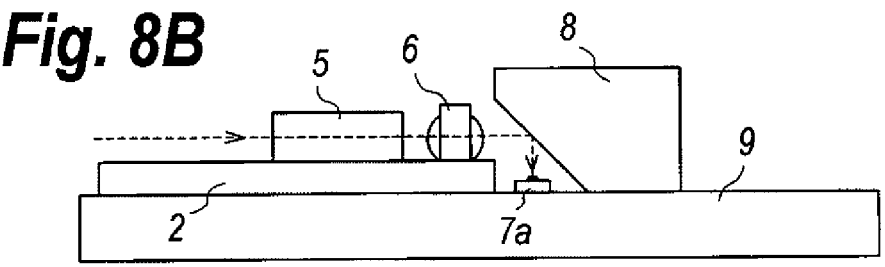

FIGS. 7A to 7C are perspective views each showing the lens assembly including the second lenses 28 and the PDs 29 mounted on the sub-mount 30. The embodiment shown in FIG. 7A has a plurality of lens elements 28A independent to each other and corresponding to respective PDs 29. Although the lens elements 28A shown in FIG. 7A each has a cylindrical shape, the lens elements 28A can be a spherical lens. The lens 28A in the present embodiment is supported by the lens support 33a, and this lens support 33a is supported by the spacer 34 provided in the ends of the sub-mount 30. The lens support 33a may have holes to pass the optical signals concentrated by the lens 28A and to go ahead respective PDs 29. The PDs 29 shown in FIGS. 7A and 7B have a plurality of PDs; while, the PDs 29 shown in FIG. 7C integrate a plurality of element devices in one body but have light-receiving surfaces independent from others.

The embodiment shown in FIG. 7B has, what is called, the arrayed lens 28B including a plurality of lens elements each corresponding to respective PDs 29 and supported by the body 33b. The body 33b, as the lens support 33a in the former embodiment, is supported by the spacer 34 in both ends thereof. FIG. 7C shows an alternative of the PDs 29, what is called, an arrayed PD 29. Thus, the PDs 29 mounted on the sub-mount 30 and the second lens 28 form an intermediate assembly processed as one element, which facilitates the assembly of the optical module 10.

Next, the process to assembly the receiver optical module 10 will be described. First, the process first assembles the optical de-multiplexer 26 and the optical reflector 27 on the bottom surface 25a of the upper base 25. In the present step of assembly, only the alignment marks shown in FIG. 4A or 4B is utilized to position the optical de-multiplexer 26 and the optical reflector 27. Concurrently with the assembly of the optical de-multiplexer 26, the PDs 29 are optically aligned with the second lens 28. Specifically, the PDs 29, the spacer 34, and the amplifying circuit 32 are first mounted on the sub-mount 30. Next, the PDs 29 are wire-bonded with the amplifying circuit 32. Then, the support 33 with the second lens 28 is optically aligned with the PDs. This alignment is carried out only by the physical dimensions of the lens 28, the lens support 33 and the spacer 34, because the optical sensing surface of the lens 29 is relatively wide, typically several tenses of micron meters in a diameter thereof, which moderates the positional accuracy between the lenses 28 and the PDs 29.

Subsequently, the intermediate assembly of the lenses 28 and PDs 29 is mounted on the position of the bottom 21 of the housing 12. Finally, the other intermediate assembly of the upper base 25 with the optical de-multiplexer 26 and the bulk reflector 27 is mounted on the bottom 21 of the housing 12 as aligning the optical de-multiplexer 26 with the coupling unit 11. Specifically, the front edge of the intermediate assembly is first abutted against the front side 20 of the housing 12. Then, the intermediate assembly is slid rearward along the optical axis on the bottom 21 by a preset distance. Lastly, fine alignments along the longitudinal and lateral directions around the position are carried out until a preset coupling efficiency between respective PDs 29 and the coupling unit 11 is obtained. Because the present receiver optical module 10 implements with two intermediate sub-assemblies, one of which includes the upper base 25 with the optical de-multiplexer 26 and the optical reflector 27, another of which includes the PDs 29 on the sub-mount 30 and the second lens 28; the process to complete the receive optical module 10 can be facilitated.

While there has been illustrated and described what are presently considered to be example embodiments of the present invention, it will be understood by those skilled in the art that various other modifications may be made, and equivalents may be substituted, without departing from the true scope of the invention. Additionally, many modifications may be made to adapt a particular situation to the teachings of the present invention without departing from the central inventive concept described herein. Therefore, it is intended that the present invention not be limited to the particular embodiments disclosed, but that the invention include all embodiments falling within the scope of the appended claims.

What is claimed is:

1. An optical module for receiving optical signals each having a specific wavelength different from others, comprising:
    a first assembly including a sub-mount, a plurality of photodiodes, and a plurality of concentrating lenses each corresponding to respective photodiodes, the sub-mount mounting the photodiodes and the concentrating lenses thereon;
    a second assembly including an upper base, a lower base, an optical de-multiplexer, and an optical reflector, the upper base mounting the optical de-multiplexer and the optical reflector thereon, the optical de-multiplexer de-multiplexing the optical signals depending on the specific wavelengths, the optical reflector reflecting the de-multiplexed optical signals toward the photodiodes through the respective concentrating lenses; and
    a housing having a bottom to install the first assembly and the second assembly thereon,
    wherein the sub-mount of the first assembly is directly mounted on the bottom and the upper base of the second assembly is indirectly mounted on the bottom through the lower base.

2. The optical module of claim 1,
    wherein the upper base has a primary surface extending substantially in parallel to the bottom of the housing.

3. The optical module of claim 2,
    wherein the primary surface of the upper base faces the bottom of the housing.

4. The optical module of claim 1,
    where the optical reflector, the concentrating lens, and the photodiodes are vertically arranged with respect to the bottom of the housing.

5. The optical module of claim 1,
    wherein the photodiodes are a type of an arrayed photodiode including a plurality of light-receiving surfaces independent of other in one body.

6. The optical module of claim 1,
    wherein the concentrating lenses are a type of an arrayed lens including a plurality of lens elements each corresponding to one of photodiodes.

7. The optical module of claim 1,
    wherein the optical de-multiplexer includes a plurality of optical reflectors and a plurality of optical filters, and
    wherein each of the optical filters has a specific band pass wavelength different from other, each of band bass wavelength corresponding to the specific wavelength of the optical signals.

8. The optical module of claim 7,
    wherein the plurality of the optical reflectors of the optical de-multiplexer reflects all of the optical signals.

9. The optical module of claim 7,
    wherein the optical de-multiplexer further includes a body transparent to the optical signals, and
    wherein the optical reflectors of the optical de-multiplexer and optical filters are attached to the body.

10. The optical module of claim 1,
    further includes a plurality of amplifying circuits each electrically connected with the respective photodiodes,
    wherein the amplifying circuits and the sub-mount of the first assembly are mounted on the bottom of the housing through a metal base.

11. A method to assemble an optical module that includes an optical de-multiplexer, an optical reflector, a plurality of concentrating lenses, a plurality of photodiodes and a housing to install the optical de-multiplexer, the optical reflector, the concentrating lenses, and the photodiodes therein, the method comprising steps of:
    mounting the photodiodes directly on a sub-mount and the concentrating lenses indirectly on the sub-mount through a post by referring to physical dimensions of the photodiodes and the concentrating lenses, the photodiodes and the concentrating lenses both mounted on the sub-mount constituting a first intermediate assembly;
    mounting the optical de-multiplexer and an optical reflector on an upper base as referring to alignment marks prepared on a surface of the upper base, the optical de-multiplexer and the optical reflector mounted on the upper base constituting a second intermediate assembly;
    installing the first intermediate assembly in a preset position on a bottom of the housing; and
    installing the second intermediate assembly within the housing as aligning the optical de-multiplexer optically with the photodiodes.

12. The method of claim 11,
    wherein the step of installing the second intermediate assembly includes steps of,
    abutting a front end of the upper base against an inner front side of the housing,
    displacing the second intermediate assembly by a preset distance toward an inner rear side of the housing, and
    performing fine alignments along a first direction connecting the inner front side and the inner rear side of the housing, and a second direction perpendicular to the first direction.

13. The method of claim 12,
    wherein the step of the fine alignments is carried out such that the photodiodes practically receive optical signals each having a specific wavelength different from others through the optical de-multiplexer.

14. An optical module for receiving a multiplexed optical signal that multiplexes a plurality of optical signals each having a specific wavelength different from others, comprising:

a first assembly including a sub-mount, a plurality of photodiodes, and a plurality of concentrating lenses each corresponding to respective photodiodes, the sub-mount mounting the photodiodes and the concentrating lenses thereon, the photodiodes converting the optical signals into respective electrical signals;

a second assembly including an upper base, a lower base, an optical de-multiplexer, and an optical reflector, the upper base mounting the optical de-multiplexer and the optical reflector on a primary surface thereof, the optical de-multiplexer de-multiplexing the multiplexed optical signal into respective optical signals, the optical reflector reflecting the de-multiplexed optical signals toward the concentrating lenses;

a plurality of amplifying circuits each amplifying the respective electrical signals; and a housing having a bottom that directly mounts the first intermediate assembly and the amplifying circuits and indirectly mounts the second intermediate assembly through the lower base, wherein the primary surface of the upper base extends in parallel to and faces the bottom of the housing.

15. The optical module of claim 14,
where the optical reflector, the concentrating lens, and the photodiodes are vertically arranged with respect to the bottom of the housing.

* * * * *